Figure 1:
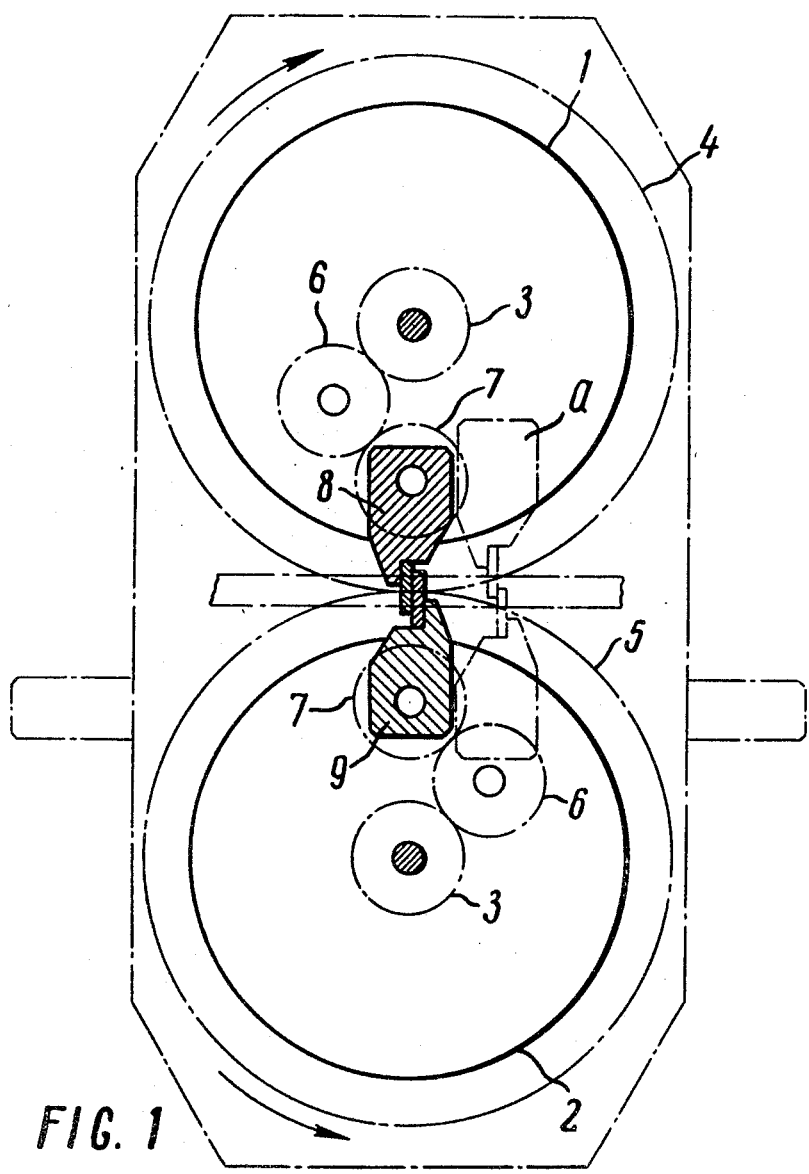

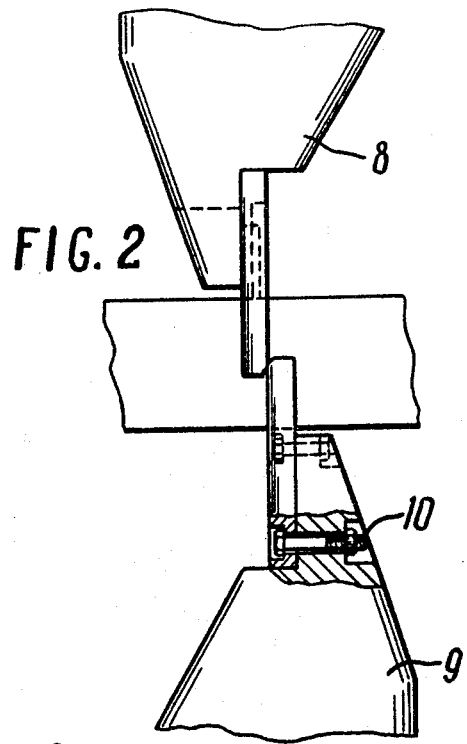
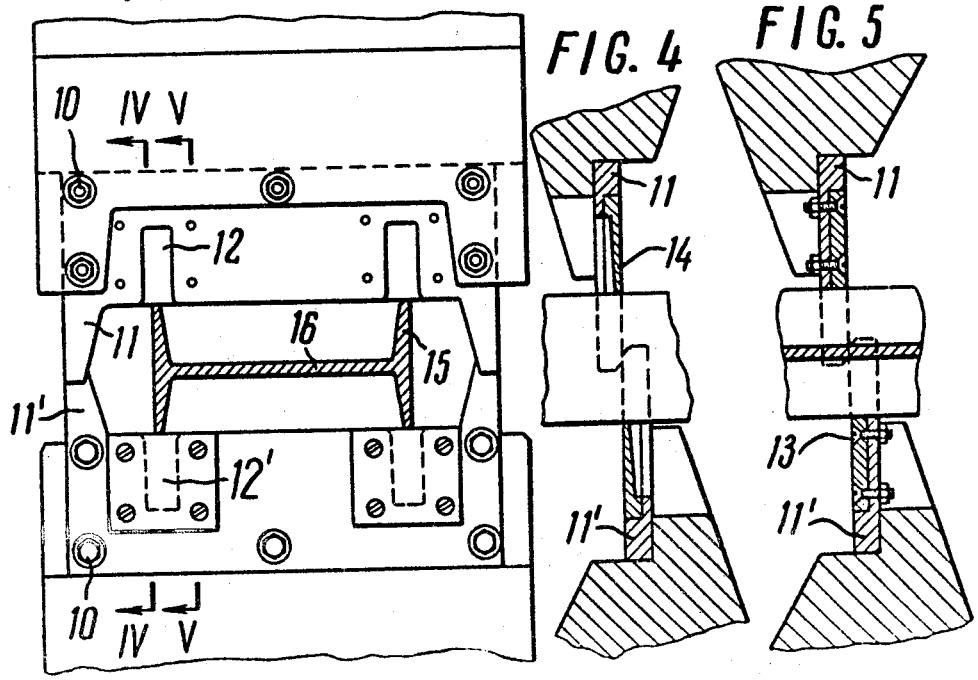

United States Patent Office 3,466,961
Patented Sept. 16, 1969

3,466,961
CUTTING ELEMENTS OF FLYING SHEARS
Vladimir Pavlovich Konovalov, Nickolai Ivanovich Krylov, Boris Vasilievich Popov, and May Mikhailovich Rudakov, Moscow, U.S.S.R., assignors to Vsesojuzny Nauchno-Issledovatelsky i Proektno-Konsturktorsky Institute metallurgicheskogo mashinostroenija, Moscow, U.S.S.R.
Filed June 1, 1965, Ser. No. 460,451
Int. Cl. B26d 1/56; B23d 25/02
U.S. Cl. 83—694
3 Claims The present invention relates to the art of cutting hot rolled stock having vertical members (such as I-beams and channels) by means of flying shears, and more specifically to flying shears with blades operating by virtue of coplanar parallel movement.

It is common knowledge nowadays that hot rolled profiled stock (such as I-beams and channels) can be cut by means of stationary circular saws on leaving a rolling mill. This necessitates the stopping of the rolled piece and its accommodation within the space between the extreme stand of the rolling mill and the cooling bank, which, in turn, requires large production floor space and much equipment and machinery. Besides, this method of cutting hot rolled stock limits the weight of initial breakdowns, interferes with the continuity of production process, and hampers the increase in the rolling speed. Furthermore, the operation of the circular saws is accompanied by severe noise and heavy sparking creating abnormal and dangerous working conditions in the shop.

Hot-rolled bars having vertical members might be cut by the use of flying shears applied currently for cutting square, round, strip, and other rolled stock thereby eliminating the aforesaid disadvantages resulting from the application of the stationary circular saws.

However, the cutting elements of flying shears used heretofore are made in the form of solid rectangular plates, and fail to perform cutting of hot-rolled stock having vertical members on account of considerable distortion thereof within the cutting zone, inasmuch as strains arising from the interaction between the blades and the metal result in buckling of the vertical members of the rolled stock and in flattening thereof. The above distortion prevents further transporting of the cut rolled stock, makes impossible the biting thereof by the rolls of the straightener and, apart from this, goes far beyond the tolerances adopted in the art.

This invention has as an object the provision of cutting elements for flying shears capable of cutting hot-rolled stock having vertical members, said cutting being effected with the stock moving, and without distorting the cross-sectional shape thereof.

According to the invention, the rectangular blades for the flying shears are provided with wedge-shaped knife blades capable of cutting vertical members of profiled rolled stock by being forced into the metal, the effective width of the rectangular blades being equal to the distance between the vertical members of the rolled stock being cut.

Figure 6:
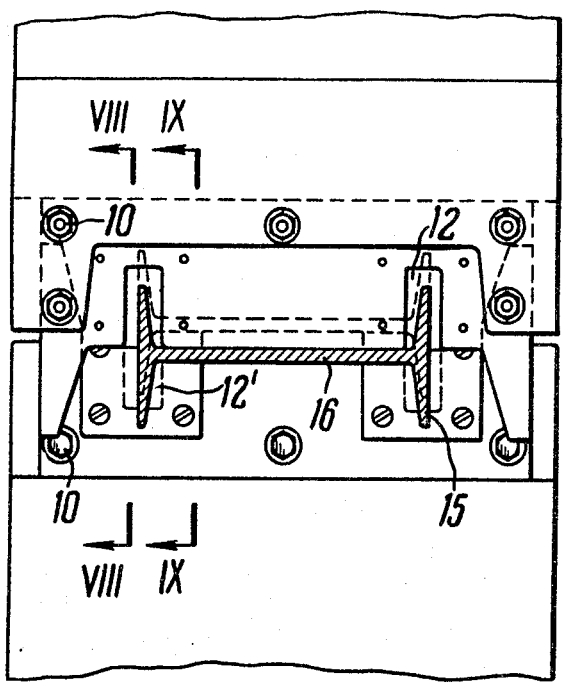
Figures 7, 8:
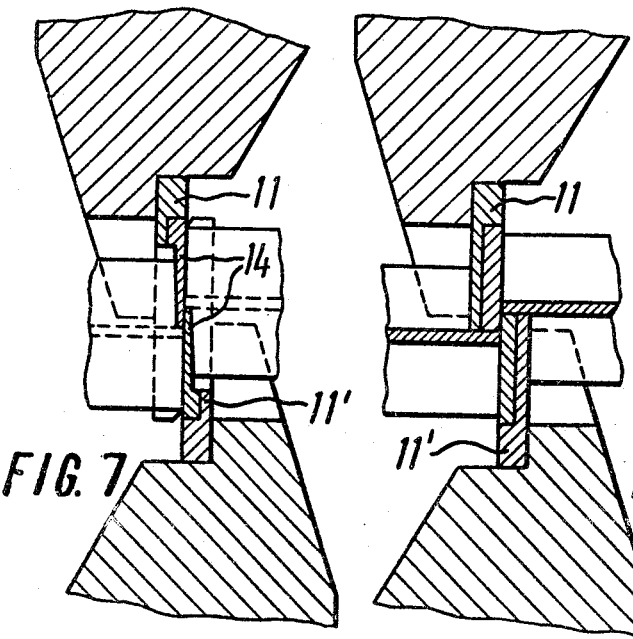

Other objects and advantages of this invention will become apparent from a consideration of the following specification, read in connection with the accompanying drawings, wherein:

FIG. 1 is a diagrammatic view of the planetary gear of flying shears operating by virtue of parallel movement of blades thereof, showing the blades in the fully advanced position; the position indicated in phantom lines corresponding to the commencement of cutting;

FIG. 2 is a side view of the blades and the I-beam being cut, showing the commencement of cutting;
FIG. 3 is a front view of same;
FIG. 4 is a section on line IV—IV of FIG. 3;
FIG. 5 is a section on line V—V of FIG. 3, showing the attachment of the wedge shaped blades to the rectangular ones;
FIG. 6 is a front view of the blades and the I-beam being cut, showing the blades in the fully advanced position.
FIG. 7 is a section on line VIII—VIII of FIG. 6; and
FIG. 8 is a section on line IX—IX of FIG. 6.

Drums 1 and 2 (FIG. 1) of the flying shears are free to rotate about the axes of stationary sun gears 3 in the directions indicated by the arrows, the synchronism of rotation thereof being attained by meshing gears 4 and 5. When drums 1 and 2 are rotating intermediate gears 6 and planet pinion 7 run around the axes of stationary sun gears 3, said intermediate gears 6 riding over said stationary sun gears 3, thereby causing said planet pinions 7 to rotate. Inasmuch as the number of teeth in the sun gears and planet pinions are the same, heads 8 and 9 which hold the cutting elements and are rigidly connected to planet pinions 7 will perform parallel movement.

Attached to heads 8 and 9 (FIG. 2) by bolts 10 are combination-type cutting elements composed of rectangular blades 11 and 11' provided with respective recesses 12, 12' serving for free passage of the vertical members of the rolled stock (FIG. 3), and knife blades 14 secured to said rectangular blades by countersunk-head bolts 13 (FIGS. 4 and 5).

As heads 8 and 9 are gradually brought together, vertical members 15 of the rolled stock being worked are cut by knife blades 14 (FIGS. 6 and 7) and freely enter corresponding recesses 12 and 12' provided in rectangular blades 11 and 11', the effective width thereof being approximately equal to the distance between the vertical members of the rolled stock being cut. Then the rectangular blades 11 and 11' contact horizontal member 16 of the rolled stock and complete the cut by displacing the two portions of the rolled stock relative to each other (FIG. 8).

When cutting channels, use is made of only one composite blade (usually the top one), contacting the vertical member of the channel, whereas the other blade (usually the bottom one) resting upon the horizontal member of the channel, is made rectangular.

The knife blades can be made in the form of separate detachable member (as can be seen form FIGS. 2 to 8), or in the form of a single insert provided with two cutting blades for each knife.

Thus, as can be seen from the foregoing, first the distortionless cutting of the vertical members is attained through the use of thin plate-like knife blades forced thereinto, and then the horizontal member is cut by rectangular knives due to axial displacement of the two portions of the rolled stock relative to each other.

We claim:
1. A cutting tool comprising first and second elements adapted for moving past one another in parallel planes, at least one of said elements including adjacent sections respectively constituted by a wedge-shaped knife blade and by a rectangular blade.
2. A tool as claimed in claim 1 for cutting an I-beam including a web and two flanges spaced at a predetermined distance on said web, each said element including a first member provided with slots spaced apart by said predetermined distance and adapted to accommodate respective of said flanges, said first member including between said slots a rectangular blade, and a second member connected to said first member and including wedge-shaped knife blades aligned with said slots.

3. A tool as claimed in claim 2, wherein the rectangular and knife blades of each element have parallel and aligned cutting edges.

References Cited

UNITED STATES PATENTS 552,784   1/1896   Sheldon _____ 83—694

ANDREW R. JUHASZ, Primary Examiner

U.S. Cl. X.R.

83—328